United States Patent
Akiyama (10) Patent No.: US 10,655,703 B2
(45) Date of Patent: May 19, 2020

(54) UPPER SUPPORT FOR SUSPENSION

(71) Applicant: SUMITOMO RIKO COMPANY LIMITED, Komaki-shi, Aichi (JP)

(72) Inventor: Yoshikane Akiyama, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 5 days.

(21) Appl. No.: 16/045,048

(22) Filed: Jul. 25, 2018

(65) Prior Publication Data

US 2019/0186585 A1   Jun. 20, 2019

(30) Foreign Application Priority Data

Dec. 19, 2017   (JP) .................................. 2017-242965

(51) Int. Cl.
*F16F 9/54* (2006.01)
*B60G 13/00* (2006.01)
*B60G 15/06* (2006.01)

(52) U.S. Cl.
CPC .............. *F16F 9/54* (2013.01); *B60G 13/003* (2013.01); *B60G 15/067* (2013.01); *B60G 2204/41* (2013.01)

(58) Field of Classification Search
CPC ........ F16F 9/54; B60G 13/003; B60G 15/067
See application file for complete search history.

(56) References Cited

U.S. PATENT DOCUMENTS

| | | | | |
|---|---|---|---|---|
| 4,592,540 A * | 6/1986 | Yokoya | ................... | B60G 17/04 188/319.1 |
| 6,764,066 B2 * | 7/2004 | Graeve | ................ | B60G 13/003 188/321.11 |
| 6,908,076 B2 * | 6/2005 | Hayashi | ................ | B60G 13/003 267/153 |
| 10,166,832 B2 * | 1/2019 | DeBruler | ................ | B60G 15/12 |
| 2002/0135111 A1 * | 9/2002 | Bishop | ................. | B60G 13/003 267/64.23 |
| 2004/0017035 A1 * | 1/2004 | Treder | ...................... | F16F 9/54 267/220 |
| 2007/0170684 A1 * | 7/2007 | Ohkita | ................. | B60G 15/063 280/124.147 |
| 2014/0299736 A1 * | 10/2014 | Itou | ...................... | B60G 13/003 248/611 |
| 2015/0273968 A1 * | 10/2015 | DeBruler | .............. | F16F 13/002 267/64.24 |

FOREIGN PATENT DOCUMENTS

JP   2008-221897 A   9/2008

* cited by examiner

*Primary Examiner* — Thomas J Williams
*Assistant Examiner* — James K Hsiao
(74) *Attorney, Agent, or Firm* — Oliff PLC

(57) ABSTRACT

An upper support for a suspension including: a main body; a lower bracket including a press-fit tube part to which an outer tube member of the main body is secured by being press-fitted; and an upper bracket covering an upper opening of the press-fit tube part such that the main body is disposed between the lower and upper brackets. The outer tube member includes at its upper end a press-fit operator projecting to a radial outside or a radial inside. A sealing rubber is bonded to the press-fit operator and projects upward, and an upper surface of the press-fit operator is partially exposed from the sealing rubber. The sealing rubber contacts the upper bracket about an entire circumference in a compressed state so as to provide a fluid-tight sealing between the press-fit operator and the upper bracket.

7 Claims, 4 Drawing Sheets

UPPER SUPPORT FOR SUSPENSION

INCORPORATED BY REFERENCE

The disclosure of Japanese Patent Application No. 2017-242965 filed on Dec. 19, 2017 including the specification, drawings and abstract is incorporated herein by reference in its entirety.

BACKGROUND OF THE INVENTION

1. Field of the Invention

The present invention relates to an upper support for a suspension for connecting a piston rod of a shock absorber that provides a vehicle suspension to a vehicle body in a vibration damping manner.

2. Description of the Related Art

Conventionally, there is known an upper support for a suspension that is attached to the upper portion of a piston rod of a shock absorber that provides a vehicle suspension, and connects the upper portion of the piston rod to a vehicle body in a vibration damping manner. As disclosed in Japanese Unexamined Patent Publication No. JP-A-2008-221897, the upper support for a suspension comprises, for example, a main body including an inner tube member made of metal fixed to the piston rod and an intermediate tube member made of metal fixed to the vehicle body via a bracket that are elastically connected to each other by a main rubber elastic body.

Besides, the main body is disposed in a housed state in a bracket comprising a lower outer tube member made of metal and an upper outer tube member made of metal. In particular, in a tall vehicle for which a fastening position of the bracket to the vehicle body is remote from the road surface, it is desirable to provide a tubular part to the lower outer tube member and make the vertical dimension of the lower outer tube member greater, as shown in JP-A-2008-221897. Accordingly, it is common to adopt a structure in which the intermediate tube member is secured by being press-fitted into the tubular part of the lower outer tube member.

Meanwhile, with the structure in which the intermediate tube member of the main body is secured by being press-fitted into the tubular part of the lower outer tube member, penetration of water through a gap between the upper outer tube member and the main body tends to be a problem. In light of that, JP-A-2008-221897 proposes a sealing structure in which a sealing rubber is provided to the intermediate tube member of the main body, and by the sealing rubber being pressed against the openings of the intermediate tube member and the lower outer tube member, the water entering through the gap between the upper outer tube member and the main body is prevented from penetrating between the press-fitting surfaces of the intermediate tube member and the lower outer tube member.

However, with the structure of JP-A-2008-221897, it is conceivable that the water entering the bracket through the gap between the main body and the upper outer tube member builds up on the upper side of the site sealed by the sealing rubber. Also, during press-fitting of the intermediate tube member into the lower outer tube member, it is necessary to push the upper end of the intermediate tube member with a jig or the like. Thus, if the entire upper surface of the intermediate tube member is covered by the sealing rubber, variability in press-fit amount may arise, making it difficult to position the main body and the lower outer tube member with sufficient accuracy. On the other hand, if there is provided a portion that is not covered by the sealing rubber at the upper end of the intermediate tube member partly in the circumferential direction, sealing performance may be deteriorated.

SUMMARY OF THE INVENTION

It is therefore one object of this invention to provide an upper support for a suspension of novel structure which makes it possible for the main body to be readily secured by press-fitting and positioned with sufficient accuracy with respect to the lower bracket, while being capable of preventing water from entering through a gap between the main body and the upper bracket and building up in the lower bracket.

The above and/or optional objects of this invention may be attained according to at least one of the following modes of the invention. The following modes and/or elements employed in each mode of the invention may be adopted at any possible optional combinations.

Specifically, a first mode of the present invention provides an upper support for a suspension comprising: a main body comprising an inner member and an outer tube member that are elastically connected by a main rubber elastic body; a lower bracket including a press-fit tube part to which the outer tube member of the main body is secured by being press-fitted; and an upper bracket covering an upper opening of the press-fit tube part of the lower bracket such that the main body is disposed between the lower bracket and the upper bracket, wherein the outer tube member includes at an upper end thereof a press-fit operator projecting to either one of a radial outside and a radial inside, an annular sealing rubber is bonded to the press-fit operator and projects to an upper side of the outer tube member, and an upper surface of the press-fit operator is partially exposed from the sealing rubber, and the sealing rubber contacts the upper bracket about an entire circumference in a compressed state such that a fluid-tight sealing is provided vertically between the press-fit operator and the upper bracket by the sealing rubber.

With the upper support constructed according to the first mode, there is provided a fluid-tight sealing vertically between the upper end of the outer tube member and the upper bracket by the sealing rubber. By so doing, even with a bracket structure in which the upper bracket includes a hole for fixing the piston rod of the shock absorber by bolting to the inner member, water that penetrates from the hole into the bracket can be prevented from reaching the lower bracket through the gap between the main body and the upper bracket. This makes it possible to prevent the lower bracket from being corroded by the water, and particularly by preventing the press-fitting surfaces of the lower bracket and the outer tube member from being corroded, it is possible to avoid deterioration of press-fit securing force between the outer tube member and the lower bracket.

Additionally, the outer tube member includes at the upper end thereof the press-fit operator projecting to the radial outside or the radial inside, and the upper surface of the press-fit operator is partially exposed from the sealing rubber. Thus, when the outer tube member is press-fitted into the press-fit tube part of the lower bracket, by directly pressing a jig or the like against the upper surface of the press-fit operator exposed from the sealing rubber and pushing the upper surface of the press-fit operator downward with the jig or the like, press-fitting force is allowed to be exerted on the outer tube member. This makes it possible to efficiently exert the press-fitting force on the outer tube member and firmly secure the outer tube member and the lower bracket by press-fitting, as well as to set the press-fit amount of the outer tube member with respect to the lower bracket with sufficient accuracy and reliably position the outer tube member and the lower bracket.

A second mode of the present invention provides the upper support according to the first mode, wherein the upper surface of the press-fit operator is exposed from the sealing rubber about the entire circumference.

With the second mode, when the outer tube member is press-fitted into the press-fit tube part of the lower bracket, the upper surface of the press-fit operator can be directly pushed about the entire circumference. Thus, the outer tube member is less likely to incline or the like and will be stably press-fitted, and larger press-fitting force can also be exerted.

A third mode of the present invention provides the upper support according to the first or second mode, wherein the sealing rubber is integrally formed with the main rubber elastic body, and the sealing rubber is bonded to a radially inner portion of the upper surface of the press-fit operator, while a radially outer portion of the upper surface of the press-fit operator is exposed from the sealing rubber.

With the third mode, since the sealing rubber is integrally formed with the main rubber elastic body, it is possible to realize the sealing structure without needing increase in the number of components, addition of vulcanization molding steps, or the like. Moreover, with the sealing rubber disposed so as to be bonded to the radially inner portion of the upper surface of the press-fit operator, it is easy to integrally form the sealing rubber with the main rubber elastic body that is disposed in the radial inside of the outer tube member. Besides, during press-fitting of the outer tube member into the lower bracket, the radially outer portion of the upper surface of the press-fit operator is pushed by the jig or the like, thereby obtaining a large area on which the press-fitting force is exerted.

A fourth mode of the present invention provides the upper support according to any one of the first through third modes, wherein the press-fit operator has a flange shape projecting to the radial outside.

With the fourth mode, since the press-fit operator projects to the radial outside, the outer tube member is allowed to have a small outside diameter dimension at its lower portion or the like which is away from the press-fit operator, thereby achieving compactization of the upper support including the lower bracket. Also, in the case in which the outer tube member is formed by deep drawing, when the press-fit operator is formed to the upper end of the outer tube member so as to project to the radial outside, the lower end of the outer tube member has a shape projecting to the radial inside. Thus, press-fitting of the outer tube member into the lower bracket will not be hindered.

A fifth mode of the present invention provides the upper support according to the fourth mode, wherein the upper end of the outer tube member comprises a small-diameter tube part that is smaller in diameter than a lower portion of the outer tube member press-fitted into the press-fit tube part of the lower bracket, and the press-fit operator is provided to the small-diameter tube part.

With the fifth mode, since the upper end of the outer tube member comprises the small-diameter tube part, the press-fit operator that projects from the small-diameter tube part to the radial outside is allowed to have a small outside diameter dimension while obtaining a sufficient widthwise dimension of the upper surface. This makes it possible to reduce the inside dimension of the bracket that houses the upper end of the outer tube member, thereby downsizing the upper support.

A sixth mode of the present invention provides the upper support according to any one of the first through fifth modes, wherein the upper bracket includes a tubular part having an upper base wall, the upper end of the outer tube member is inserted in a remote state from the tubular part of the upper bracket to the radial inside, and the sealing rubber contacts the upper base wall of the tubular part about the entire circumference in the compressed state such that the fluid-tight sealing is provided vertically between the press-fit operator and the upper base wall of the tubular part by the sealing rubber.

With the sixth mode, it is possible to obtain a sufficient vertical dimension of the housing area for housing the main body between the upper bracket and the lower bracket, while being allowed to set the fastening position to the vehicle body which is set depending on the superposed faces of the upper bracket and the lower bracket with an enough degree of freedom, for example.

According to the present invention, in the structure where the outer tube member of the main body is secured by being press-fitted into the lower bracket, the fluid-tight sealing is provided vertically between the upper end of the outer tube member and the upper bracket by the sealing rubber, so that the water penetrating into the bracket can be prevented from reaching the lower bracket through the gap between the main body and the upper bracket. Besides, the outer tube member includes at the upper end thereof the press-fit operator projecting to the radial outside or the radial inside, and at least a portion of the upper surface of the press-fit operator is exposed from the sealing rubber. Thus, when the outer tube member is press-fitted into the press-fit tube part of the lower bracket, by directly pushing the upper surface of the press-fit operator exposed from the sealing rubber with a jig or the like, it is possible to firmly secure the outer tube member and the lower bracket, as well as to set the press-fit amount of the outer tube member with respect to the lower bracket with sufficient accuracy.

BRIEF DESCRIPTION OF THE DRAWINGS

The foregoing and/or other objects, features and advantages of the invention will become more apparent from the following description of embodiments with reference to the accompanying drawings in which like reference numerals designate like elements and wherein.

DETAILED DESCRIPTION OF EMBODIMENTS

Embodiments of the present invention will be described below in reference to the drawings.

Figure 1:
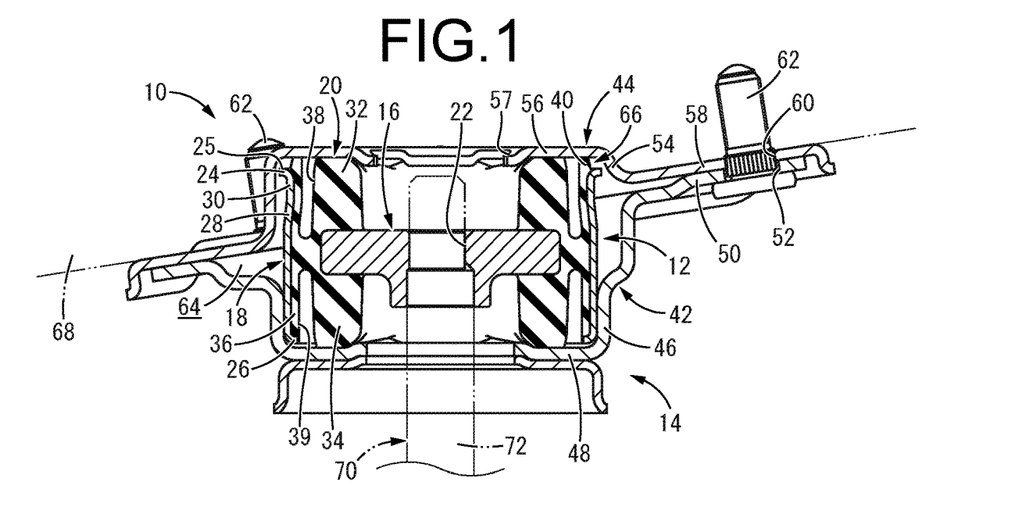
FIG. 1 is a cross sectional view showing an upper support according to a first embodiment of the present invention, taken along line 1-1 of FIG. 2.
Figure 2:
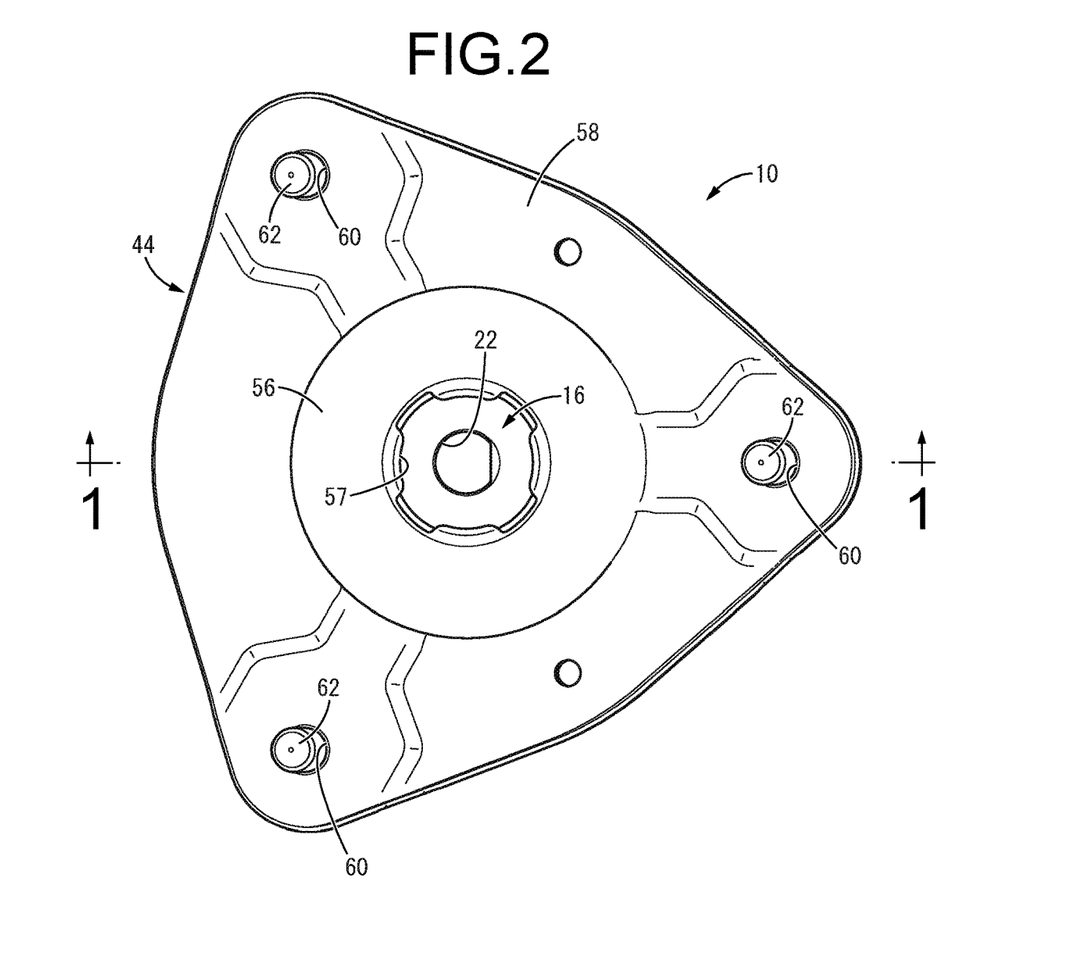
FIG. 2 is a top plan view of the upper support shown in FIG. 1.
Figure 3:
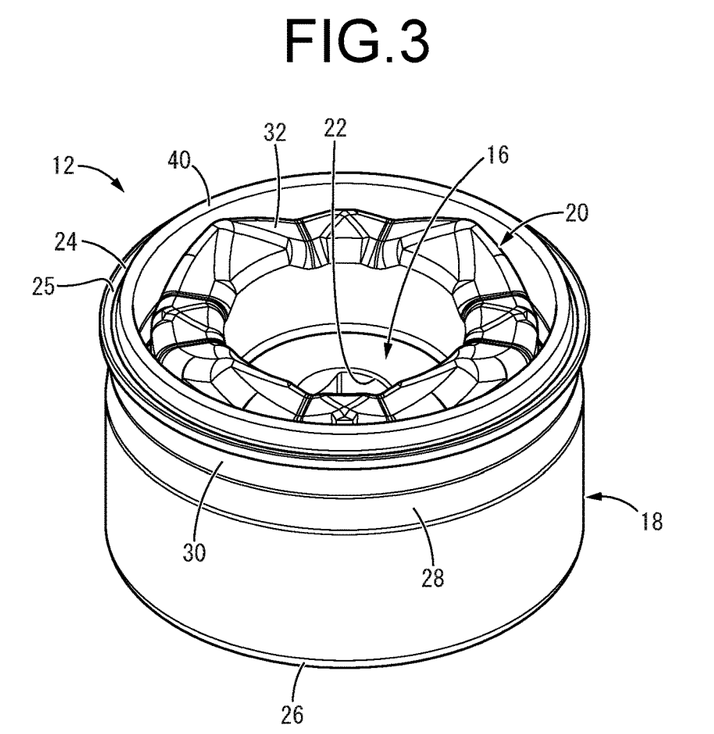
FIG. 3 is a perspective view of a main body of the upper support shown in FIG. 1.
Figure 4:
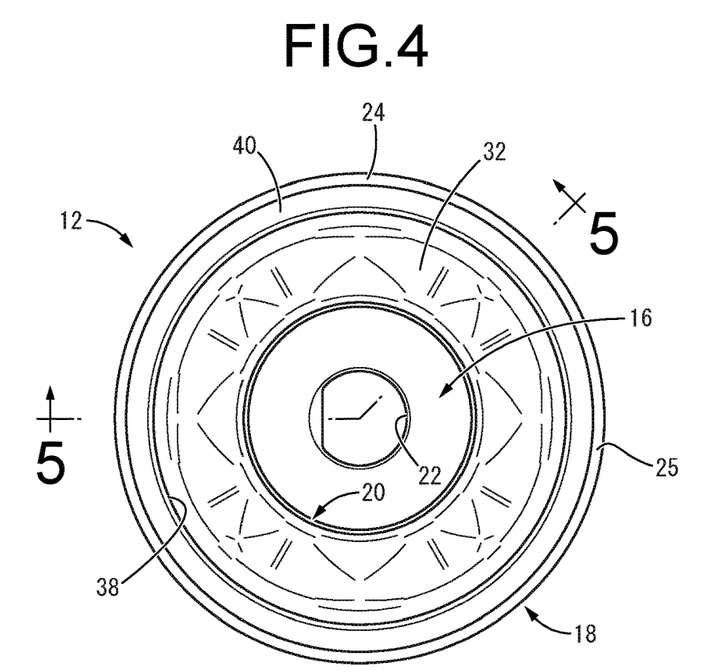
FIG. 4 is a top plan view of the main body shown in FIG. 3.

FIG. 1 depicts an upper support for a suspension 10 (hereafter called "upper support 10") according to a first embodiment of the present invention. The upper support 10 includes a main body 12 to which a bracket 14 is attached. In the description hereinbelow, as a general rule, the vertical direction refers to the vertical direction in FIG. 1.

Described more specifically, as shown in FIGS. 3 through 6, the main body 12 includes an inner member 16 and an outer tube member 18 that are elastically connected to each other by a main rubber elastic body 20.

The inner member 16 is a high rigidity component made of metal or the like and has a generally circular disk shape overall, with its diametrical center section projecting downward from the lower surface so as to be partially thick-walled. Moreover, the diametrical center section of the inner member 16 is vertically perforated by an insertion hole 22, into which a piston rod 72 of a shock absorber 70 (described later) is configured to be inserted.

The outer tube member 18 is a high rigidity component made of metal or the like and has a thin-walled, large-diameter, generally round tubular shape whose inside diameter dimension is made larger than the outside diameter dimension of the inner member 16. Moreover, the outer tube member 18 includes at its upper end a press-fit operator 24 having a flange shape projecting to the radial outside. The press-fit operator 24 according to the present embodiment is integrally formed on the outer tube member 18 by the upper end of the outer tube member 18 being bent to the radial outside. Furthermore, an upper surface 25 of the press-fit operator 24 comprises a plane that extends orthogonally to the vertical direction, while its radially inner end comprises a curved surface that downwardly slopes toward the radial inside so as to be smoothly continuous with the radially inner face of the outer tube member 18. The outer tube member 18 according to the present embodiment is formed by press working (deep drawing), so that the upper end thereof is provided with the press-fit operator 24 projecting to the radial outside, while the lower end thereof is provided with an internal flange-shaped reinforcing part 26 projecting to the radial inside.

No limitation is imposed as to the specific shape of the press-fit operator. In a top plan view of the outer tube member in isolation, namely when seen in top view in the axial direction, it is acceptable as long as, on the outer circumferential face or the inner circumferential face of the outer tube member, there is presented a surface on which press-fitting force can be exerted by a jig or the like during press-fitting in the axial direction. Incidentally, the outer tube member 18 according to the present embodiment is constituted by the portion above the upper curved point of the outer tube member 18. That is, the inner circumferential face of the outer tube member 18, which is presented on the top view in the axial direction of the outer tube member 18 by the upper end of the outer tube member 18 being curved to the radial outside, serves as the upper surface 25 of the press-fit operator 24.

Figure 6:
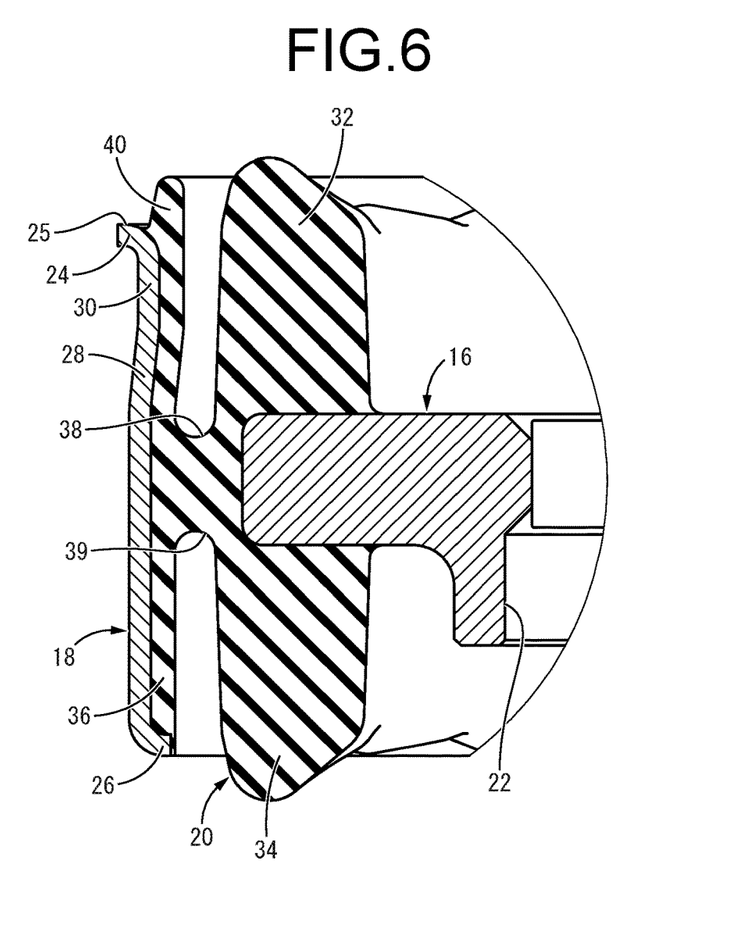
FIG. 6 is a cross sectional view of a principal part of the main body shown in FIG. 5.

Moreover, as shown in FIG. 6, the vertically medial portion of the outer tube member 18 is provided with a tapered part 28 that gradually becomes smaller in diameter toward the upper side. The upper end of the outer tube member 18 comprises a small-diameter tube part 30 that is smaller in diameter than a portion below the tapered part 28. The press-fit operator 24 is provided to the upper end of the small-diameter tube part 30 so as to project to the radial outside. Also, with the outer tube member 18, the portion axially between the tapered part 28 and the reinforcing part 26 has a straight round tubular shape extending with a generally constant cross-sectional shape.

Figure 5:
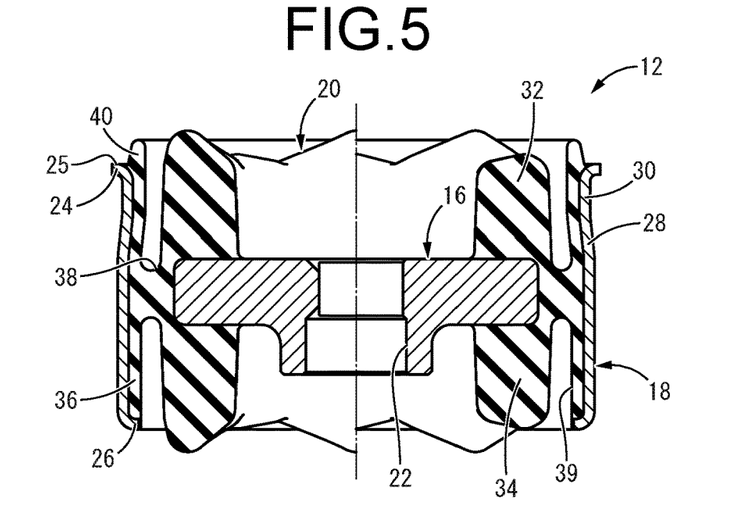
FIG. 5 is a cross sectional view taken along line 5-5 of FIG. 4.

Then, the inner member 16 is disposed radially inside the outer tube member 18, and the inner member 16 and the outer tube member 18 are elastically connected by the main rubber elastic body 20. As shown in FIG. 5, the main rubber elastic body 20 has a generally annular shape, with its radially inner end bonded by vulcanization to the radially outer end of the inner member 16, while its outer circumferential face bonded by vulcanization to the inner circumferential face of the outer tube member 18. The main rubber elastic body 20 according to the present embodiment takes the form of an integrally vulcanization molded component incorporating the inner member 16 and the outer tube member 18.

Furthermore, the radially inner end of the main rubber elastic body 20 is provided with an upper stopper rubber 32 and a lower stopper rubber 34. The upper and lower stopper rubbers 32, 34 both have a generally round tubular shape, and respectively project upward and downward at the radially outer end of the inner member 16. Besides, with the upper and lower stopper rubbers 32, 34, the projecting distal ends become radially narrower toward the distal end, and the projecting heights vary in the circumferential direction, thereby minimizing sudden development of high dynamic spring during vibration input in the vertical direction.

Additionally, a rubber sheath layer 36 is provided to the radially outer end of the main rubber elastic body 20. The rubber sheath layer 36 has a thin-walled, large-diameter, generally round tubular shape, and is bonded to the inner circumferential face of the outer tube member 18 so as to cover the inner circumferential face of the outer tube member 18 including the reinforcing part 26 roughly over the entirety. The outer circumferential faces of the upper and lower stopper rubbers 32, 34 and the inner circumferential face of the rubber sheath layer 36 are remote from each other in the radial direction. With this configuration, annular recessed grooves 38, 39 are provided radially between the rubber sheath layer 36 and the upper and lower stopper rubbers 32, 34 so as to open onto the upper and lower faces respectively and extend in the circumferential direction.

Here, the rubber sheath layer 36 is provided with a sealing rubber 40 on its upper side. The sealing rubber 40 has a generally round tubular shape or annular shape extending in the circumferential direction about the entire circumference with a generally constant cross-sectional shape, and is integrally formed with the main rubber elastic body 20 including the rubber sheath layer 36 in the present embodiment. The sealing rubber 40 is bonded at its radially outer end to the radially inner end of the upper surface 25 of the press-fit operator 24 of the outer tube member 18, and projects toward the upper side from the press-fit operator 24. Meanwhile, the radially outer portion of the upper surface 25 of the press-fit operator 24 is not covered by the sealing rubber 40 but is exposed about the entire circumference. Furthermore, the sealing rubber 40 according to the present embodiment becomes gradually narrower in the radial direction toward its projecting distal end.

It would also be possible to constrict the outer tube member 18 in diameter by performing a diameter reduction process such as 360-degree radial compression thereon after vulcanization molding of the main rubber elastic body 20, so as to pre-compress the main rubber elastic body 20 in the radial direction. This will reduce tensile stress due to contraction after molding of the main rubber elastic body 20, thereby improving durability.

Figure 7:
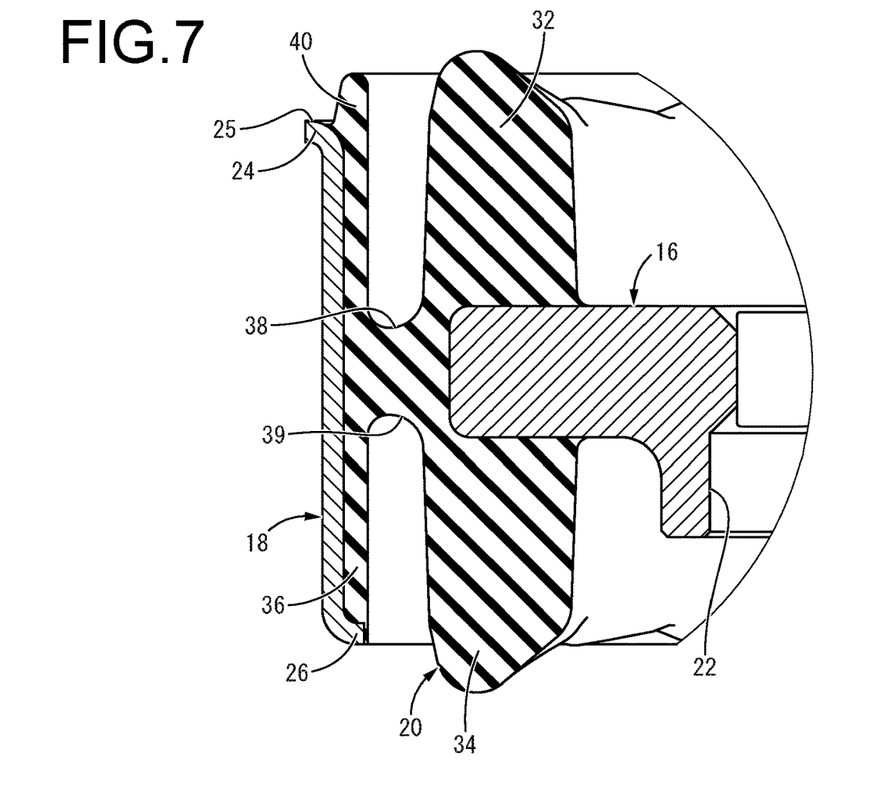
FIG. 7 is a cross sectional view of a principal part of the main body shown in FIG. 5 before a diameter reduction process.

Besides, during the diameter reduction process of the outer tube member 18, it would also be acceptable to provide the tapered part 28 and the small-diameter tube part 30 to the outer tube member 18 by constricting the upper end of the outer tube member 18 so as to be smaller in diameter than the other portion thereof. In this case, before the diameter reduction process of the outer tube member 18, as shown in FIG. 7, the tapered part 28 and the small-diameter tube part 30 are not provided to the outer tube member 18. Accordingly, the outer tube member 18 has a straight round tubular shape extending in the vertical direction with a generally constant cross section axially between the press-fit operator 24 and the reinforcing part 26.

Moreover, the tapered part 28 and the small-diameter tube part 30 are positioned above the bottom face of the upper recessed groove 38 of the main rubber elastic body 20 to be described later. By so doing, the portion of the main rubber elastic body 20 that connects the inner member 16 and the outer tube member 18 in the radial direction, in other words, the portion of the main rubber elastic body 20 that is positioned vertically between the upper and lower recessed grooves 38, 39, is configured so as not to be pre-compressed any more than necessary when the tapered part 28 and the small-diameter tube part 30 are provided.

The main body 12 of the above construction is attached to the bracket 14 in a housed state. The bracket 14 is formed of metal or the like and is high in rigidity, and has a structure in which a lower bracket 42 and an upper bracket 44 are combined in the vertical direction.

The lower bracket 42 has a bowl shape with a collar overall, and includes a press-fit tube part 46 of generally round tubular shape. Besides, at the lower end of the press-fit tube part 46, there is integrally formed a bottom wall 48 of generally annular disk shape that extends toward the radial inside. Moreover, at the upper end of the press-fit tube part 46, there is integrally formed a mounting flange 50 of generally annular disk shape that extends toward the radial outside. The mounting flange 50 is perforated in the thickness direction by bolt holes 52 at several locations in the circumferential direction. In the present embodiment, the upper end face of the press-fit tube part 46 is positioned on the plane that extends while inclining with respect to the axis-perpendicular direction, so that the mounting flange 50 provided to the upper end of the press-fit tube part 46 also extends on the plane that inclines with respect to the axis-perpendicular direction. Besides, since the upper end face of the press-fit tube part 46 inclines with respect to the lower end face, the vertical dimension of the press-fit tube part 46 varies in the circumferential direction. Furthermore, with the portion of the press-fit tube part 46 whose vertical dimension is minimal, the inside diameter dimension is constant roughly overall in the vertical direction, while with the portion of the press-fit tube part 46 whose vertical dimension is large, the upper portion is made large in diameter. Accordingly, with the portion of the press-fit tube part 46 into which the outer tube member 18 is press-fitted, the vertical dimension and the inside diameter dimension are generally constant about the entire circumference.

The upper bracket 44 has a vertically inverted bowl shape with a collar overall, and includes a tubular part 54 having a generally round tubular shape. Besides, at the upper end of the tubular part 54, there is integrally formed an upper base wall 56 of generally annular disk shape that extends toward the radial inside. The radial inside of the upper base wall 56 is vertically perforated by an inner hole 57. The inner hole 57 according to the present embodiment is partially enlarged in diameter at four locations in the circumferential direction, so that the inside diameter dimension thereof varies in the circumferential direction. Furthermore, at the lower end of the tubular part 54, there is integrally formed a mounting flange 58 of generally annular disk shape that extends toward the radial outside. The mounting flange 58 is perforated in the thickness direction by bolt holes 60 at several locations in the circumferential direction. In the present embodiment, the lower end face of the tubular part 54 is positioned on the plane that extends while inclining with respect to the axis-perpendicular direction, so that the mounting flange 58 provided to the lower end of the tubular part 54 also extends on the plane that inclines with respect to the axis-perpendicular direction.

Then, the lower bracket 42 and the upper bracket 44 are vertically overlapped such that their openings are butted at each other, and by the mounting flanges 50, 58 overlapped on each other being fixed by means such as welding, the bracket 14 is formed. Moreover, with the bracket 14, the bolt holes 52 of the lower bracket 42 and the bolt holes 60 of the upper bracket 44 are arranged at the positions corresponding to each other, and mounting bolts 62 inserted into the bolt holes 52 of the lower bracket 42 from below are press-fitted into the bolt holes 60 of the upper bracket 44 so that their shaft portions project upward.

Furthermore, with the bracket 14, there is formed a housing area 64 vertically between the bottom wall 48 of the lower bracket 42 and the upper base wall 56 of the upper bracket 44, and the main body 12 is disposed in the housing area 64.

More specifically, before the lower bracket 42 and the upper bracket 44 are combined, the outer tube member 18 of the main body 12 is secured by being press-fitted into the press-fit tube part 46 of the lower bracket 42 from above. In the present embodiment, the axial dimension of the press-fit tube part 46 is made smaller than the axial dimension of the portion of the outer tube member 18 below the tapered part 28, so that the lower portion of the outer tube member 18 is partially press-fitted into the press-fit tube part 46.

Besides, when the outer tube member 18 is press-fitted into the press-fit tube part 46, a jig (not shown) for exerting press-fitting force on the outer tube member 18, for example, is overlapped on the upper surface 25 of the press-fit operator 24 provided to the upper end of the outer tube member 18 in a state of direct contact. In the present embodiment, the radially inner portion of the press-fit operator 24 is covered by the sealing rubber 40, and the jig or the like is overlapped on the radially outer portion of the upper surface 25 of the press-fit operator 24 exposed from the sealing rubber 40.

Then, by the press-fitting force being exerted downwardly on the outer tube member 18 by the jig, the lower portion of the outer tube member 18 is press-fitted into the press-fit tube part 46 of the lower bracket 42, whereby the main body 12 is secured to the lower bracket 42 at the outer tube member 18.

In this way, since the radially outer portion of the press-fit operator 24 of the outer tube member 18 is exposed from the sealing rubber 40, when the outer tube member 18 is press-fitted into the lower bracket 42, by pushing the radially outer portion of the upper surface 25 of the press-fit operator 24, the press-fitting force is allowed to be directly exerted downwardly on the outer tube member 18 without interposing an elastic body. This makes it possible to exert a larger press-fitting force on the outer tube member 18, as well as to avoid variability in the press-fitting amount due to deformation of the elastic body, thereby positioning the main body 12 and the lower bracket 42 with high accuracy.

In the present embodiment, the radially outer portion of the upper surface 25 of the press-fit operator 24 is exposed without being covered by the sealing rubber 40 about the entire circumference. Thus, an area on which the press-fitting force is exerted by a jig can be largely obtained, while being capable of exerting the press-fitting force in a balanced manner about the entire circumference. Therefore, press-fit securing force can be greatly obtained, and since inclination or the like of the outer tube member 18 with respect to the lower bracket 42 is prevented, the press-fitting operation becomes easy.

Moreover, the upper bracket 44 is overlapped from above and secured on the lower bracket 42 to which the main body 12 is attached. By so doing, the upper opening of the press-fit tube part 46 of the lower bracket 42 is covered by the upper bracket 44, and the main body 12 is disposed between the upper and lower brackets 44, 42 so as to be housed in the housing area 64 of the bracket 14. The inner circumferential face of the tubular part 54 of the upper bracket 44 is made larger in diameter than the inner circumferential face of the press-fit tube part 46 of the lower bracket 42, as well as made larger in diameter than the outer circumferential face of the press-fit operator 24 of the outer tube member 18. With this configuration, the upper end of the outer tube member 18 including the press-fit operator 24 is inserted in a remote state from the tubular part 54 of the upper bracket 44 to the radial inside. Besides, the upper and lower stopper rubbers 32, 34 of the main body 12 are pressed respectively against the upper base wall 56 of the upper bracket 44 and the bottom wall 48 of the lower bracket 42, so as to be compressed in the vertical direction.

Here, the sealing rubber 40 projecting upward from the outer tube member 18 is pressed against the upper base wall 56 of the upper bracket 44 from below at the radial outside of the upper stopper rubber 32 about the entire circumference. In this way, the sealing rubber 40 contacts the upper base wall 56 of the upper bracket 44 in a compressed state, so as to constitute a sealing part 66 that provides a fluid-tight or liquid-tight sealing vertically between the press-fit operator 24 of the outer tube member 18 and the upper base wall 56 of the upper bracket 44. Since the outer tube member 18 to which the sealing rubber 40 is bonded is secured to the bracket 14, even during input of vibration, the sealing rubber 40 will be retained in a state of stable contact with respect to the upper base wall 56 of the upper bracket 44.

Owing to this sealing part 66, in the case in which water penetrates into the housing area 64 of the bracket 14 through the inner hole 57 of the upper base wall 56 of the upper bracket 44, the water will not enter through a gap between the main body 12 and the upper bracket 44 to the radial outside of the sealing part 66. This makes it possible to prevent the water from adhering to the outer circumferential face of the outer tube member 18 or building up in the lower bracket 42, thereby avoiding corrosion of the lower bracket 42 or the outer tube member 18. In particular, by preventing the water from entering between the press-fitting surfaces of the press-fit tube part 46 of the lower bracket 42 and the outer tube member 18, corrosion of the press-fitting surfaces by the water can be avoided, thereby maintaining desired press-fit strength with stability.

Furthermore, since the sealing rubber 40 is provided to the radially inner portion of the press-fit operator 24 in continuous fashion about the entire circumference, the sealing part 66 exhibits excellent sealing performance, thereby effectively preventing penetration of water. Additionally, in the present embodiment, the sealing rubber 40 is integrally formed with the main rubber elastic body 20, so that the sealing part 66 is realized through a simple structure without needing increase in the number of components.

In this way, with the upper support 10 according to the present embodiment, the radially outer portion of the press-fit operator 24 provided to the upper end of the outer tube member 18 enables the outer tube member 18 to be press-fitted into the lower bracket 42. Besides, since the sealing rubber 40 contacts the upper base wall 56 of the upper bracket 44 in a compressed state, fluidtightness between the outer tube member 18 and the upper bracket 44 is sufficiently obtained.

Also, the press-fit operator 24 of the outer tube member 18 has a flange shape projecting to the radial outside, thereby largely obtaining the outside diameter dimension of the press-fit operator 24 with respect to the outside diameter dimension of the lower portion of the outer tube member 18 that is press-fitted into the lower bracket 42. Moreover, in the case in which the press-fit operator 24 is formed by the upper end of the outer tube member 18 being bent, no curving face will be formed due to the bending on the radially outer end of the press-fit operator 24 configured to be pushed by a jig or the like during press-fitting, thereby avoiding slip of the jig or the like.

Furthermore, in the present embodiment, since the press-fit operator 24 is provided to the small-diameter tube part 30, even though the press-fit operator 24 has a flange shape projecting to the radial outside, it is possible to adjust the outside diameter dimension of the press-fit operator 24 so as not to be excessively large while obtaining a sufficient widthwise dimension of the upper surface 25 of the press-fit operator 24 in the radial direction.

The upper support 10 is used in a vehicle such as an automobile, for example, by being mounted between a vehicle body 68 and a piston rod 72 of a shock absorber 70. More specifically, as shown in FIG. 1, the piston rod 72 of the shock absorber 70 is inserted into the insertion hole 22 of the inner member 16, while a nut (not shown) inserted through the inner hole 57 is threaded onto the upper end of the piston rod 72, whereby the piston rod 72 is secured to the inner member 16. Meanwhile, the bracket 14 secured to the outer tube member 18 is fixed to the vehicle body 68 by the mounting bolts 62. By so doing, the upper support 10 is interposed between the piston rod 72 of the shock absorber 70 and the vehicle body 68 so as to connect the piston rod 72 and the vehicle body 68 to each other in a vibration damping manner. Then, the upper support 10 is configured to exhibit desired vibration damping effect with respect to vibration input in the vertical direction based on energy attenuation effect or the like of the main rubber elastic body 20 including the upper and lower stopper rubbers 32, 34.

In the upper support 10 according to the present embodiment, the press-fit tube part 46 is provided to the lower bracket 42, while the tubular part 54 is provided to the upper bracket 44. This makes it possible to set the vertical positions of the mounting flanges 58, 50 of the upper and lower brackets 44, 42 with a larger degree of freedom without the need for changing the positions of the bottom wall 48 of the lower bracket 42 and the upper base wall 56 of the upper bracket 44. This allows the mounting location of the bracket 14 with respect to the vehicle body 68 to be readily adjusted depending on the structure of the vehicle side.

Figure 8:
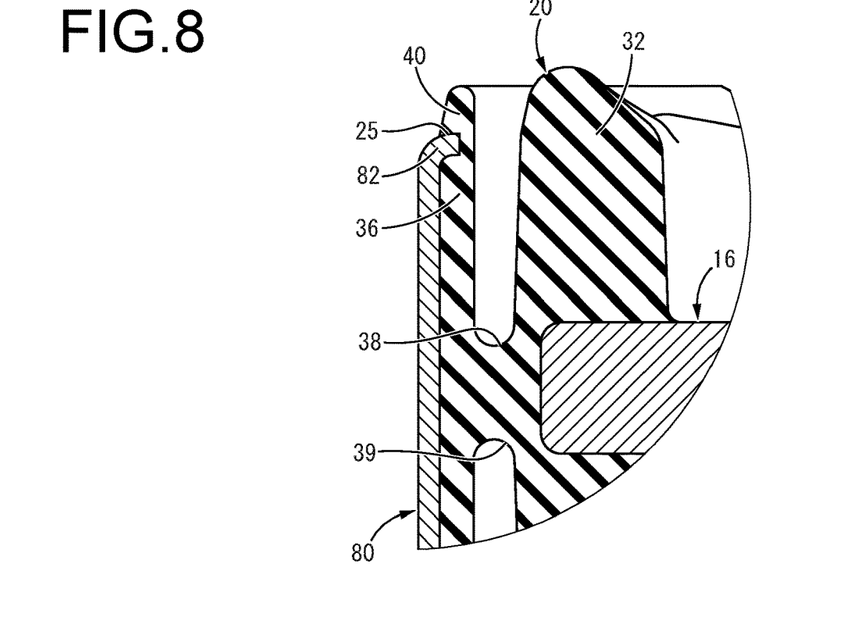
FIG. 8 is a cross sectional view of a principal part of a main body of an upper support according to another embodiment of the present invention.

An embodiment of the present invention has been described in detail above, but the present invention is not limited to those specific descriptions. For example, the press-fit operator may be provided in a shape of inner flange that projects to the radial inside from the upper end of the outer tube member. As a specific example, as shown in FIG. 8, by bending the upper end of an outer tube member 80 so as to project to the radial inside, a press-fit operator 82 may be formed. With this press-fit operator 82, the sealing rubber 40 is bonded to the radially inner end, namely the projecting distal end, while the upper surface of the radially outer end, namely the proximal end, is exposed without being covered by the sealing rubber 40. With this configuration, by pushing the radially outer end of the upper surface 25 with a jig or the like, the outer tube member 80 is allowed to be press-fitted into a lower bracket (not shown). It should be appreciated that with the press-fit operator 82 of the outer tube member 80 according to the present embodiment, the outer circumferential face of the outer tube member 80, which is presented on the top view in the axial direction of the outer tube member 80 by the upper end of the outer tube member 80 being curved to the radial inside, serves as the upper surface 25 of the press-fit operator 82.

Moreover, the small-diameter tube part 30 provided to the upper end of the outer tube member 18 in the preceding embodiment is not essential. In particular, in the case in which the press-fit operator has a shape of inner flange, the small-diameter tube part 30 is dispensable.

Besides, the sealing rubber may be a separate component from the main rubber elastic body. For example, by forming the sealing rubber and the main rubber elastic body of different rubber materials, it is also possible to reliably achieve respective performances required of the main rubber elastic body and the sealing rubber.

Furthermore, the specific shape of the bracket is merely exemplary, and for example, the shape of the mounting flanges 50, 58, the number and placement of the mounting bolts 62, or the like can be suitably changed. Also, the structure of the upper bracket 44 is not necessarily limited to the one including the tubular part 54, but may have a roughly plate shape, for example, and the upper end of the outer tube member 18 may be arranged so as not to project upward from the lower bracket 42.

What is claimed is:

1. An upper support for a suspension comprising:
   a main body comprising an inner member and an outer tube member that are elastically connected by a main rubber elastic body;
   a lower bracket including a press-fit tube part to which a lower portion of the outer tube member of the main body is secured by being press-fitted; and
   an upper bracket covering an upper opening of the press-fit tube part of the lower bracket such that the main body is disposed between the lower bracket and the upper bracket, wherein
   the outer tube member includes at an upper end thereof a press-fit operator projecting to either one of a radial outside and a radial inside,
   an annular sealing rubber is bonded to the press-fit operator and projects to an upper side of the outer tube member, and an upper surface of the press-fit operator is partially exposed from the sealing rubber, and
   the annular sealing rubber contacts the upper bracket about an entire circumference in a compressed state such that a fluid-tight sealing is provided vertically between the press-fit operator and the upper bracket by the annular sealing rubber,
   the upper end of the outer tube member comprises a small-diameter tube part that is smaller in diameter than the lower portion of the outer tube member press-fitted into the press-fit tube part of the lower bracket, and
   the upper bracket includes a tubular part having an upper base wall, the upper end of the outer tube member is spaced, in radial direction, from the tubular part of the upper bracket, and the annular sealing rubber contacts the upper base wall of the tubular part about the entire circumference in the compressed state such that the fluid-tight sealing is provided vertically between the press-fit operator and the upper base wall of the tubular part by the annular sealing rubber.

2. The upper support according to claim 1, wherein the upper surface of the press-fit operator is exposed from the annular sealing rubber about the entire circumference.

3. The upper support according to claim 1, wherein the annular sealing rubber is integrally formed with the main rubber elastic body, and the annular sealing rubber is bonded to a radially inner portion of the upper surface of the press-fit operator, while a radially outer portion of the upper surface of the press-fit operator is exposed from the annular sealing rubber.

4. The upper support according to claim 1, wherein the press-fit operator has a flange shape projecting to the radial outside.

5. The upper support according to claim 1, wherein the press-fit operator projects to the radial outside.

6. The upper support according to claim 1, wherein a radially outer end of the press-fit operator is spaced from the tubular part of the upper bracket.

7. The upper support according to claim 1, wherein a space between a distal end of the press-fit operator and the upper base wall is not occupied by the annular sealing rubber.

* * * * *